United States Patent
Srivastava (10) Patent No.: US 7,360,201 B2
(45) Date of Patent: Apr. 15, 2008

(54) AUTOMATED ANALYSIS AND IDENTIFICATION OF OPTIONS IN PROJECT MANAGEMENT

(75) Inventor: Biplav Srivastava, Delhi (IN)

(73) Assignee: International Business Machines Corporation, Armonk, NY (US)

(*) Notice: Subject to any disclaimer, the term of this patent is extended or adjusted under 35 U.S.C. 154(b) by 667 days.

(21) Appl. No.: 10/314,822

(22) Filed: Dec. 9, 2002

(65) Prior Publication Data

US 2004/0128645 A1 Jul. 1, 2004

(51) Int. Cl.
*G06F 9/44* (2006.01)
(52) U.S. Cl. .................. 717/101; 717/104; 717/105
(58) Field of Classification Search ............... 717/101, 717/104, 105
See application file for complete search history.

(56) References Cited

U.S. PATENT DOCUMENTS

| | | | | |
|---|---|---|---|---|
| 5,446,895 | A * | 8/1995 | White et al. ............... | 717/101 |
| 5,519,866 | A * | 5/1996 | Lawrence et al. .......... | 717/162 |
| 5,548,506 | A | 8/1996 | Srinivasan | |
| 5,758,160 | A * | 5/1998 | McInerney et al. ......... | 717/104 |
| 5,771,179 | A * | 6/1998 | White et al. ............... | 702/183 |
| 5,784,286 | A * | 7/1998 | Hirose et al. ............. | 717/113 |
| 5,930,798 | A * | 7/1999 | Lawler et al. ............ | 717/104 |
| 5,953,525 | A * | 9/1999 | Glaser et al. ............. | 717/102 |
| 6,106,569 | A | 8/2000 | Bohrer et al. | |
| 6,167,564 | A | 12/2000 | Fontana et al. | |
| 6,237,020 | B1 | 5/2001 | Leymann et al. | |
| 6,240,395 | B1 | 5/2001 | Kumashiro | |
| 6,381,580 | B1 | 4/2002 | Levinson | |
| 6,493,693 | B1 * | 12/2002 | Hill ............................. | 706/46 |
| 2004/0117361 | A1 * | 6/2004 | Greer et al. .................. | 707/3 |

FOREIGN PATENT DOCUMENTS

WO WO 02/03225 1/2002

OTHER PUBLICATIONS

Weld D., "Recent Advances in AI Planning", AI Magazine, vol. 20, No. 2, 1999, pp. 93-123.
"Rogue Wave® SourcePro™ Core", downloaded from Internet website www.rogue.com/products/sourcepro/core/spdcore.pdf on Oct. 23, 2002.
Lyne et al., "Reuseable Software Development Toolset", IBM Technical Disclosure Bulletin No. MA886-0163, vol. 33, No. 2, Jul. 1990.

* cited by examiner

*Primary Examiner*—Wei Zhen
*Assistant Examiner*—Qamrun Nahar
(74) *Attorney, Agent, or Firm*—Gibb & Rahman, LLC (57) ABSTRACT

The present invention relates to a method, a system and a computer program product for automatically identifying options in a project that includes existing components. The method includes the steps of generating representations of existing components (910), storing the representations for retrieval (920), formulating one or more decision problem/s or decision support issue/s arising in the project as a planning problem using one or more of the representations (930) and solving the planning problem using automated reasoning techniques to identify options relating to the project (940). Preferably, formulation of the project as a planning problem includes defining the input data specification of the project as the initial state of the planning problem, defining the functionality requirement of the project as the goal state of the planning problem and defining one or more of the existing components as actions of the planning problem.

31 Claims, 7 Drawing Sheets

AUTOMATED ANALYSIS AND IDENTIFICATION OF OPTIONS IN PROJECT MANAGEMENT

FIELD OF THE INVENTION

The present invention relates generally to project management and more particularly to management of the development and maintenance of software projects.

The present relates invention generally to project management and more particularly to management of the development and maintenance of software projects.

BACKGROUND

As software systems become increasingly complex, it is increasingly necessary for organizations to invest more significantly in the development and maintenance of such software systems (collectively called software life cycle management). A software program is typically organized as a collection of components or modules that can, in turn, be recursively made up of smaller sub-components.

When a new software program is created, the developer typically manually evaluates the relevance of existing components based on development objectives such as available time and an expected performance metric. Similarly, when a software program has been released and is being maintained, any updates to the dependent components is evaluated, either manually or blindly (possibly through timestamps), to determine whether a rebuild of the software program is necessary.

A key challenge in software life cycle management is how to effectively leverage or gain the benefit of existing software components while using resources to: (a) develop and support software to a specification and (b) deliver the software in a timely manner.

A Work Breakdown Structure (WBS) is commonly used to identify the different tasks at some granularity and input this information to a project management tool along with estimates on the time and resources required for each task. Microsoft Project™ (MS Project) is a standard tool used in industry for scheduling activities. Once a user has defined a task network, the critical path of the project and the slack times for individual tasks are determined. Task assignments can then evaluated to identify over-allocated resources. To resolve resource over-allocation, the resources must either be allocated differently or tasks must be re-scheduled (a euphemism for "delayed") until the necessary resource/s is/are available. A resource in a commercial project typically refers to a person but can also comprise equipment, etc.

When a new software program is created, the user (typically a project manager or software developer) manually evaluates the relevance of existing software components based on development objectives like development time and required software performance. Similarly, when a released software program is being maintained, any updates or patches to the dependent components is manually evaluated to determine whether the software program requires rebuilding. Although certain tools for tracking component dependencies and recording the history of component releases are available, a major problem in software management still remains that trade-off choices have to be manually evaluated.

U.S. Pat. No. 5,548,506, entitled "Automated, Electronic Network Based, Project Management Server System, for Managing Multiple Work-Groups", issued on Aug. 20, 1996 to Srinivasan et al. This patent focuses on collaborative project management using a central server computer system.

U.S. Pat. No. 6,381,580, entitled "Automatic Planning and Cueing System and Method", issued on Apr. 30, 2002 to Levinson and is assigned to Attention Control Systems, Inc. This patent relates to a calendaring system and method for reminding a user of upcoming tasks and appointments and for automatically planning a user's calendar based on inputted tasks and goals of a user and cueing the user at the beginning and end of a task or appointment.

U.S. Pat. No. 6,240,395, entitled "Device and Method for Project Management", issued on May 29, 2001 to Kumashiro et al. and is assigned to Fujitsu Limited. This patent relates to the generation of schedule tables, the collection of information during operations and provision of a visualization device for project management.

U.S. Pat. No. 6,237,020, entitled "Task-Oriented Automatic Distribution of Software", issued on May 22, 2001 to Leyman et al. and is assigned to IBM Corporation. This patent relates to the field of computer systems acting as workflow management systems (WFMS) and describes a software distribution mechanism based on flow information.

U.S. Pat. No. 6,106,569, entitled "Method of Developing a Software System Using Object Oriented Technology", issued on Aug. 22, 2000 to Bohrer et al. and is assigned to IBM Corporation. This patent relates to frameworks in various application domains (such as finance) and the reuse of pre-developed modules in the context of a framework. Neither automated selection of software components for reuse nor automated maintenance of software components is disclosed.

U.S. Pat. No. 6,167,564, entitled "Software System Development Framework", issued on Dec. 26, 2000 to Fontana et al. and is assigned to Unisys Corporation. This patent relates to frameworks for domains based on business models, domain models, reusable components (technology dependent or independent) and artifacts. Changes or updates can be discovered within the context of a framework, which may assist reuse of components. However, all reasoning is done within a user-created framework. Neither automated selection of software components for reuse nor automated maintenance of software components is disclosed.

U.S. Pat. No. 5,930,798, entitled "Universal Data Measurement, Analysis and Control System", issued on Jul. 27, 1999 to Lawler et al. and is assigned to Predicate Logic, Inc. This patent relates to the collection and use of metrics relating to software (e.g. collection of performance data) for analysis of software process improvement. The disclosure focuses on component modelling rather than component selection. Neither automated selection of software components for reuse nor automated maintenance of software components is disclosed.

International Patent Publication No. WO/03225, entitled "Method and System for Product LifeCycle Management", by Davies et al., published Jan. 10, 2002, relates to a collaborative application development environment where reuse is facilitated by modelling of business objects with software components arranged therein. Neither automated selection of software components for reuse nor automated maintenance of software components is disclosed.

IBM Technical Disclosure Bulletin MA886-0163, Vol. 33, No. 2, July 1990, by Lyne et al. and entitled "Reusable Software Development Toolset", relates to user selection of reusable components from a palette. Neither automated selection of software components for reuse nor automated maintenance of software components is disclosed.

Reusable software library organisers, such as Rogue-Wave® SourcePro™Core by Rogue Wave Software of 5500 Flatiron Parkway Boulder, Colo. 80301 USA, organize software components to facilitate later reuse. However, a user still has to review the components manually to identify possible candidates that can be used in a software project. No support is available to a user to assist with decisions relating to the tradeoff between the integration time of the software component into the project and the software component's potential performance.

Tools like Microsoft Project™ show timelines or deadlines for tasks and dependencies of tasks. However, a user has to manually select software components to progress a project to completion.

The Make software tool provides a simple way to detect changes in dependent components and rebuild a software program based selectively on need. But since the Make software tool uses a timestamp of a component rather than any change in the component's functionality, unnecessary rebuilds of the software may result.

Accordingly, a need exists to provide a method, a system and a computer program product that can automatically identify different options and assist a user in making decisions relating to management of a project.

A more specific need exists to provide a decision support system, a method and a computer program product capable of assisting a user to make decisions relating to development and maintenance options in a software project, by automatically identifying and analyzing different available options.

SUMMARY

Aspects of the present invention relate to a method, a system and a computer program product for automatically identifying options in a project that includes existing components. The method includes the steps of generating representations of existing components, storing the representations for retrieval, formulating one or more issues arising in the project as a planning problem using one or more of the representations and solving the planning problem using automated reasoning techniques to identify options relating to the project.

Further aspects of the present invention relate to a decision support method, a decision support system and a computer program product for management of a software project that uses existing software components. The method includes the steps of generating models of existing software components, storing the models for retrieval, formulating one or more decision problem/s arising in the project as a planning problem using one or more of the models and solving the planning problem using automated reasoning techniques to identify options relating to the management of the software project.

The solution to the planning problem can include the identification of existing components for reuse, the identification of existing components to be upgraded and the specification of new components to be developed.

Preferably, formulation of the project as a planning problem includes defining the input data specification of the project as the initial state of the planning problem, defining the functionality requirement of the project as the goal state of the planning problem and defining one or more existing components as actions of the planning problem. Each action has one or more precondition/s corresponding to input/s of a component and each action has one or more effect/s corresponding to output/s of a component.

A model of an existing component can include one or more characteristics including the functionality of the component, the dependency of the component on other components, the performance of the component, the effort required to develop the component, and the effort required to integrate the component. Certain of the foregoing characteristics can comprise/s structured information available at the time of release of a software component.

In a software maintenance project, models of software components can be stored and used for solving decision support issues/problems. An example of such a problem is the determination of which components will be affected by some impending change and how best those components could be upgraded. The specific decision support problems mentioned are illustrative of the general category of software development and maintenance. The decision support problems, formulated as planning problems, can be solved by a wide variety of automated reasoning techniques like model checking and constraint satisfaction.

BRIEF DESCRIPTION OF THE DRAWINGS

Features and preferred embodiments of the present invention are described hereinafter, by way of example only, with reference to the accompanying drawings in which.

DETAILED DESCRIPTION

A method, a computer system and a computer program product are described hereinafter for the automated analysis of software development and maintenance options. For ease of explanation, the preferred method, computer system and computer program product are described with specific reference to the development and maintenance of software programs. However, it is not intended that the present invention be so limited as the principles thereof have general applicability to the development and/or maintenance of projects that comprise a collection of components or modules. Specifically, other decision-support problems can be formulated and solved by the method, computer system and computer program product described hereinafter.

Decision-support Issues in Software Project Management

There are two main categories of decision-support issues in software projects-those related to software development and those related to software maintenance. The method, computer system and computer program product described hereinafter can be used to formulate and automatically solve specific decision-support issues or problems in both categories:

Software Development Category.
    When creating a new software program A, help the user:
        Reuse—Find existing components B that can accomplish part of work of A (candidates for reuse)
        Reduce—Optimize development by reducing effort (but not features specified) of A by finding how to use B to minimize scope and complexity of any new software development for A.

Figure 1:
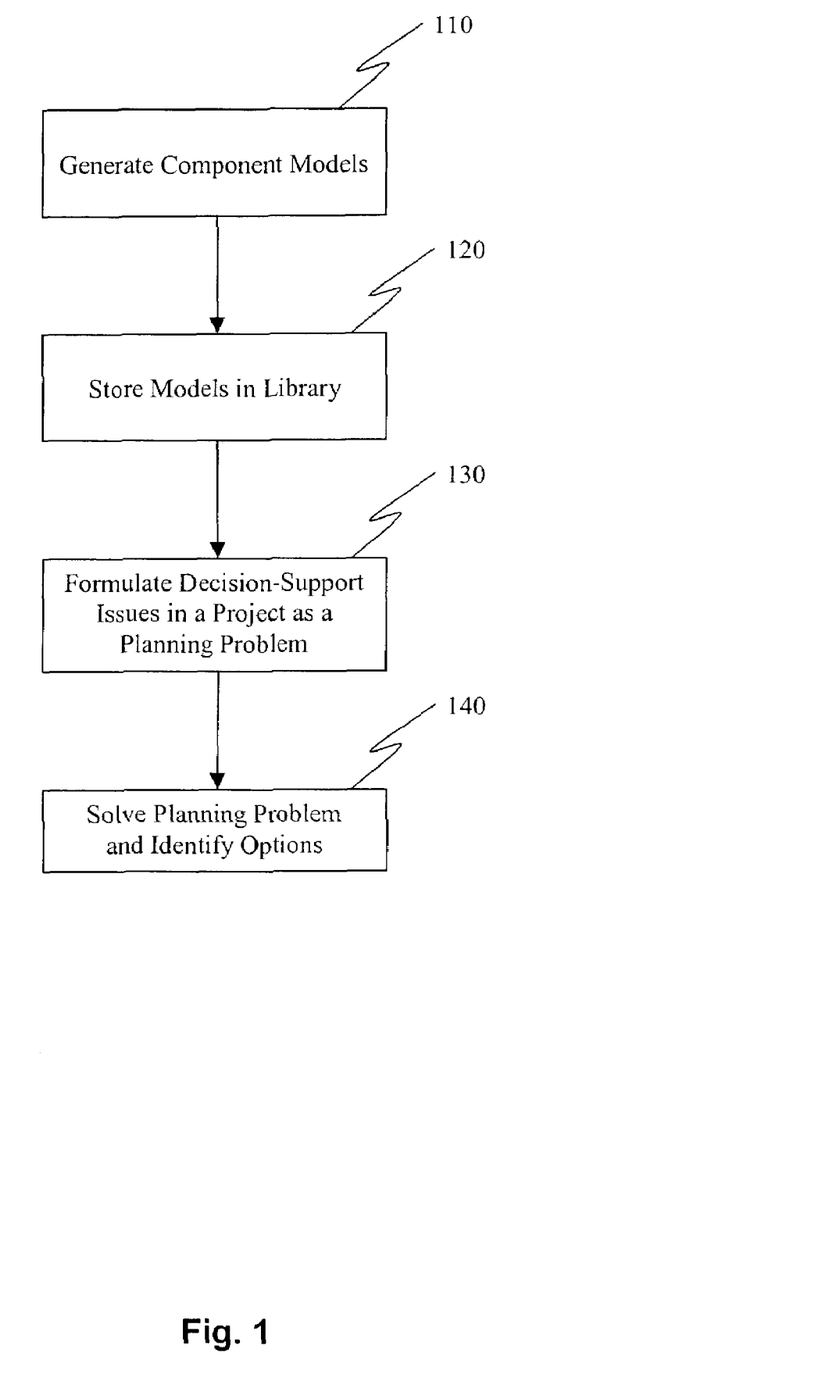
FIG. 1 is a flow diagram of a method for automatically identifying options in a project that includes existing components.

Software Maintenance Category.
    While an existing software A is in use, help the user:
        Aware—Detect newly released enhancements of sub-components B that provide functionality towards A.
        Upgrade—Evaluate and incorporate new enhancements only if necessary for the functionality objective of A Formulating and Solving a Decision-Support Problem as an Instance of a Planning Problem FIG. 1 is a flow diagram of a method for automatically identifying options in a project that includes existing components. Representations or models of reusable components are generated at step 110 and stored in a library (such as a computer database) at step 120. The decision-support issues in a project are formulated as planning problem instances at step 130 and are solved, using automated reasoning techniques, to identify options relating to the project at step 140.

A formal model of a software component is typically built from structured information available about that component at release time. One example of such information is the dependency list that software release tools such as Make use. Optionally, software developers can provide information such as the expected effort to build and/or integrate a component (typically in units of time) and a performance/cost metric for a particular component (ie. a performance vs effort tradeoff).

Information about a software component, including preconditions (dependencies or inputs) and effects (functionalities or outputs), is represented by predicates. A predicate is a logical construct that refers to the relationship between objects, where the latter are represented by terms (constants or variables).

A state T is simply a collection of facts with the semantics that information corresponding to the predicates in the state holds (i.e. is true). The decision-support problems in a software project can thus be described as suitable instances of Artificial Intelligence (AI) planning problems. Further and more detailed information about planning problems is available in a publication by Daniel S. Weld, entitled "Recent Advances in AI Planning", AI Magazine, Volume 20, No. 2, 1999, pp 93-123. The formal model for each software component is appropriately stored and referenced by the system as needed.

To solve the decision problems of how best to develop a new software program or how best to implement modifications to existing software components while reducing the impact on other software components, a planning problem is formulated and solved using algorithms.

A planning problem P is a 3-tuple<I, G, A>
where:
    I is the complete description of the initial state,
    G is the partial description of the goal state, and
    A is the set of executable (primitive) actions.

An action $A\_i$ is applicable in a state T if the precondition of $A\_i$ is satisfied in T and the resulting state T' is obtained by incorporating the effects of $A\_i$. An action sequence S (a plan) is a solution to P if S can be executed from I and the resulting state of the world contains G.

State-space planners are a type of planner algorithm that search in the space of possible plans (sequences of actions). Table 1, hereinafter, is a pseudo-code template of a standard state-space planner that can reason with information of components (actions) represented as predicates. The software component or routine FindSequence can accept problems wherein information is represented as predicates. FindSequence is used as a base planner to illustrate certain embodiments, however, the present invention is also applicable to other types of planners called plan-space planners (i.e. planners which reason in the space of world (information) states).

TABLE 1

```
FindSequence(I, G, A)
  1.  If I ⊃ G
  2.    Return {}
  3.  End-if
  4.  Ninit.sequence = {}; Ninit.state = I
  5.  Q = {Ninit}
  6.  While Q is not empty
  7.    N = Remove an element from Q (heuristic choice)
  8.    Let S = N.sequence; T = N.state
  9.    For each component Ai in A
 10.      If precondition of Ai is satisfied in state S
 11.        Create new node N' with:
              N'.state = Update S with result of effect of Ai and
              N'.sequence = Append(N.sequence, A_I)
 12.      End-if
 13.      If N'.state ⊃ G
 14.        Return N' ;; Return a plan
 15.      End-if
 16.      Q = Q U N'
 17.    End-for
 18.  End-while
 19.  Return FAIL ;; No plan was found
```

The insight in posing a software project as a planning problem is that the initial state I is nothing but input data specification, while the goal state G is the functionality required from the software. Each component present in the software library is an action $A\_i$ with inputs corresponding to the preconditions and outputs corresponding to the effects. Moreover, any constraints with respect to input/output parameters can be encoded in an action specification.

Any suitable planner that can accept a particular information representation can be used to synthesize a sequence of actions to achieve a goal. A planner can also be made to reason about performance and time estimates among potential plans to meet an optimization criteria.

In the case of a software program to be built from specific components, or when one or more of a required sequence of components (plan) is unavailable from the library, embodiments of the present invention assist a user to determine the scope of any new component/s to be developed to achieve all the required functionalities. To obtain an estimate of the new development, the planner has to sort the search space of non-solutions based on the heuristic distance to the goal. The plan with the lowest such heuristic provides the candidate plan requiring the least new development. The planner can be written based on cost-based planning algorithms (existing and/or new) or by the software verification technique of model-checking on the planning formalism.

Example: Development of a New Software Application Using Existing Components

Figure 2:
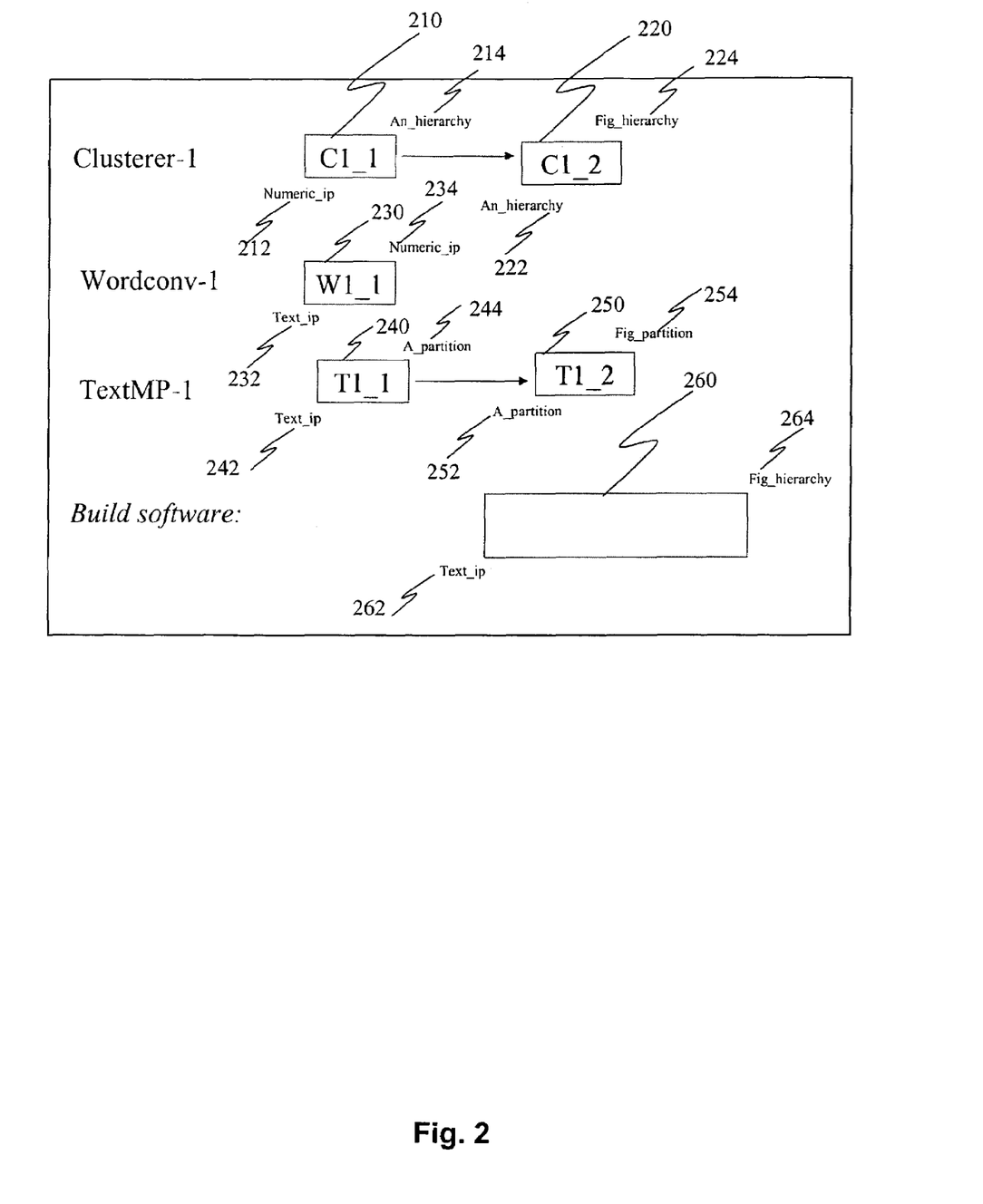
FIG. 2 is a representation of a requirement for a text miner software program.

FIG. 2 shows a user requirement to build a new text miner software program or component 260 that can accept text as input and display a hierarchical view of the clusters of that text. A user (e.g., a project manager or programmer) would typically desire to know the various options available for reuse of existing components in order to minimise any new development. According to FIG. 2, the available software components are a clustering implementation with two reusable sub-components 210 and 220 (C1_1 and C1_2, respectively), a converter 230 (W1_1) for converting words to numeric form and a text miner with two sub-components 240 and 250 (T1_1 and T1_2, respectively).

Software components can be characterized by the functionality provided, other software components depended on, a measure of performance (such as actual runtime) and the amount of effort required to build and/or integrate the particular component. Facts about a component are represented as ground predicates according to a convention that dependencies (preconditions or inputs) 212, 222, 232, 242, 252, 262 are shown at the lower left side of a component box while the functionalities (effects or outputs) 214, 224, 234, 244, 254, 264 are shown at the upper right corner of a compnent box. Performance and effort metrics are optional and, when modelled, are represented as a pair of numbers in square brackets below a component box.

Figure 3A:
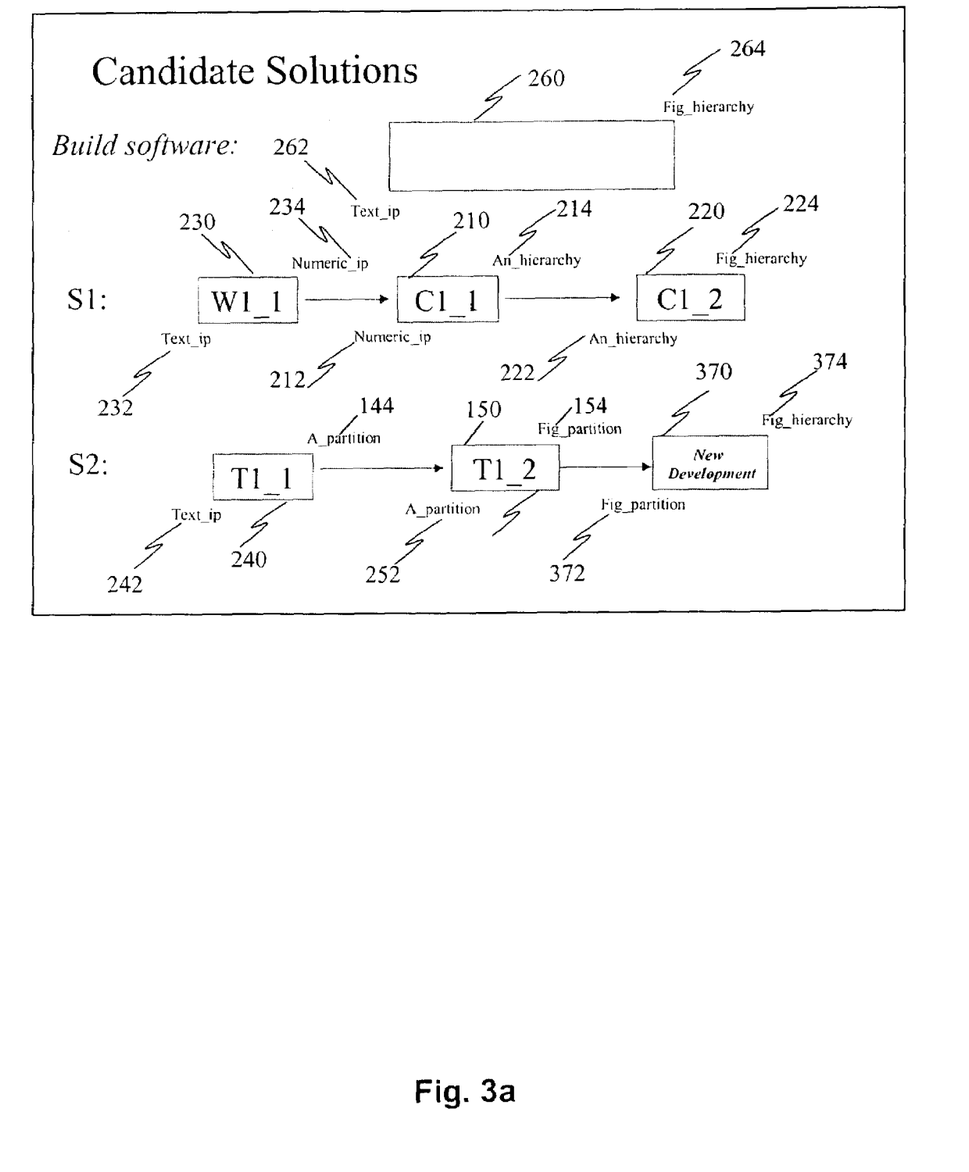
FIG. 3a is a representation of candidate solutions for the software program of FIG. 2.

FIG. 3a shows options or candidate solutions S1 and S2 that are generated in response to the requirements of FIG. 2. S1 represents a solution to build the required software program 260 using existing components 230, 210 and 220. S2 represents a solution to build the required software program 260 using existing components 240, 250 and a new component 370. Solution S2 additionally indicates a dependency (input) 372 and a functionality (output) 374 of the new component 370. Thus, embodiments of the present invention can be used to derive a requirements specification for new components to be developed.

Figure 3B:
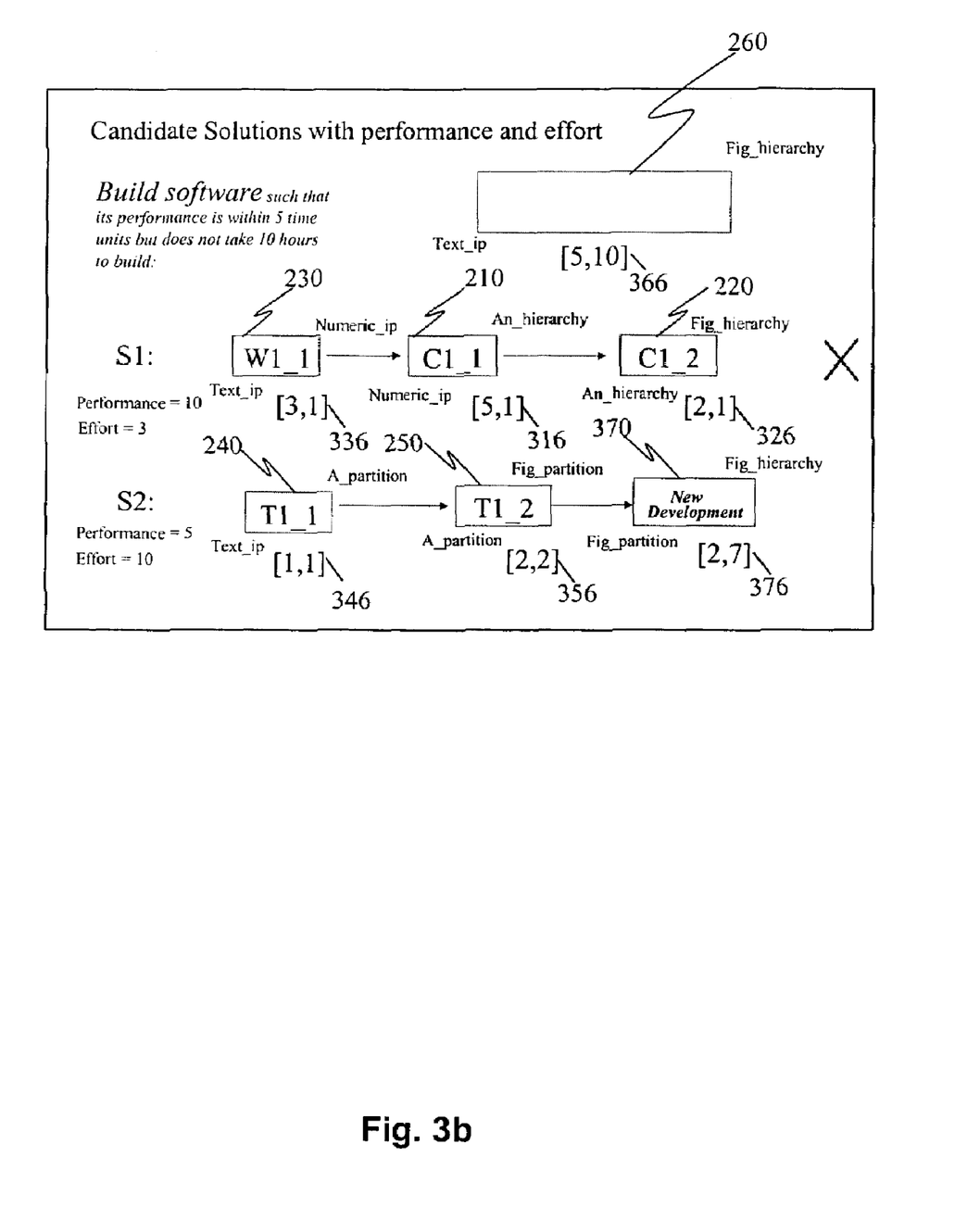
FIG. 3b is another representation of candidate solutions for the software program of FIG. 2.

In modelling software development problems, a measure to gauge a component's performance (such as actual runtime) and the amount of effort required to build and/or integrate a component are useful. FIG. 3b shows the new text miner software program 260, of FIGS. 2 and 3a, that can accept text as input and display a hierarchical view of the clusters. However, additional requirements of the text miner software program 260 included in FIG. 3b are a capability of execution within 5 seconds and a build and/or integration time of within 10 hours. The additional requirements are shown as predicates 366 in FIG. 3b. The existing components in solutions S1 and S2 (as per FIG. 3a) also indicate estimated information regarding execution and integration time in FIG. 3b.

The performance and effort metrics are individually cumulative for each solution. Thus, the performance metric for solution S1 is: 3+5+2=10, which exceeds the maximum value of 5 required by the text miner 260 and solution S1 does not meet the required specification. Solution S2, on the other hand, will meet the required specification provided that the new component 370 can be developed to meet the requirements of predicates 376 (i.e. being capable of execution within 2 seconds and building/integration within 7 hours).

Representation of Software Components

Software components can be characterized by the functionality provided, other software components depended on, a measure of performance (such as runtime) and the amount of effort required to build and/or integrate the particular component:

Functionality

The functionality (i.e. effects) of a software component is represented by predicates. A predicate is a construct from logic that informally refers to words, potentially parameterized, and that represent some information in the domain. An example of a parameterized predicate is Summarize(?doc ?lang), meaning a software that produces a summary of the document denoted by variable ?doc in the language ?lang. An instance of this predicate is Summarize(IBMQ1Report, French) which refers to the case when the software summarizes IBM Q1 report in the French language. Semantics or the meaning of predicates is both assigned and meaningful only to the humans/applications of the domain. Since functionality about a software program is known to the software creators, often as part of the requirements gathering step, one way to obtain such information is directly from the software developers as part of the software release information.

Dependency

Dependencies (i.e. preconditions) of a software component are represented by predicates. An important source of this information are the Make files used to build the software, as illustrated in a simple example in Table 2 hereinafter:

TABLE 2 all: c1 c2 link
c1:
 ...
c2:
 gcc -c moo.c
link:
 gcc foo.o moo.o -o software

The example in Table 2 shows that to build the software "all", the build dependency is on c1, c2 and the link steps. c1 and c2 are potential software dependencies. Eventually, the precise software dependencies are known completely by the software creators. Hence, a manner of obtaining such information is by requiring such to be provided by the software developer/s as part of the software release information.

Performance

The performance measure of a software component depends on a variety of factors ranging from the context in which the software component is used to the time taken to complete execution of the software component. This measure can generally be estimated as some numeric cost of executing the software where the cost information is of importance to the decision maker.

One example of a simple cost measure is the estimated execution time on a typical data size (e.g., "1sec for XML parser on 1 MB XML data"). Such data can be obtained from performance testing or field trials. Another example is precision information about data mining components on specific types of inputs, (e.g., "label persons in a document with 0.9 accuracy").

Effort

The effort required to integrate a software component with other software components depends on a variety of factors such as the software development methodology, the organization of the software reuse library, the skill of the developers, the available details of the components, etc. However, over time, effort information as a temporal quantity (e.g. 1 week) can be collected from actual usage of the components and provided to solve the software decision problems. Another source for obtaining such information is experienced software developers who have used similar components in previous projects.

Application Scenarios-Software Development

The following section describes embodiments of the present invention in software development applications. Suppose that a user has a software components library and wishes to build a new software program A:

Reuse of Software Components

In creating the new software program A, the user can find and reuse existing software components B (candidates for reuse) to form part of program A.

Figure 4:
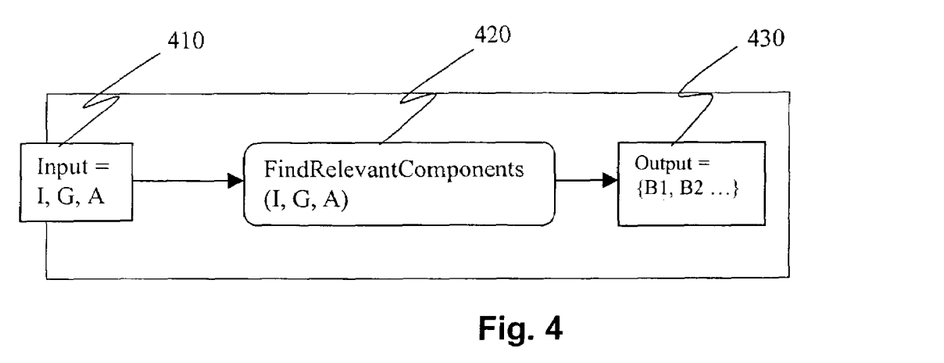
FIG. 4 is a flow diagram of a formulation of a software development problem to identify reusable existing components.

FIG. 4 shows a formulation of this problem. At step 410, the user provides inputs I, G and A to the system (typically a computer-based decision support system). Input I represents the input data specification, goal state G represents the desired functionality and input A represents the set of executable actions. The system finds the relevant components at step 420 and outputs a list software component candidates for reuse at step 430.

An embodiment of a method/algorithm to identify any relevant components (ie. achieving G, starting from I) is shown in Table 3, hereinafter.

TABLE 3

FindRelevantComponent(I, G, A)
1. RelevantComps = {}
2. If I ⊃ G
3.   Return RelevantComps
4. End-if
5. T = G; Tlast = {}
6. While T not equal to Tlast
7.   Select a component Ai in A
8.   If effect of Ai is satisfied in state T
9.     RelevantComps = RelevantComps U Ai
10.    Tlast = T
11.    T = Update(T, A.precondition)
12.  End-if
13. End-while
14. Return RelevantComps Reduction of Complexity and Scope of Software Components In creating a new software program A, the user can optimize development by reducing effort without altering the specified features of program A. This is achieved by determining which software components B to use, and how these components are to be used, to minimize the scope and complexity of any new software development for program A.

Figure 5:
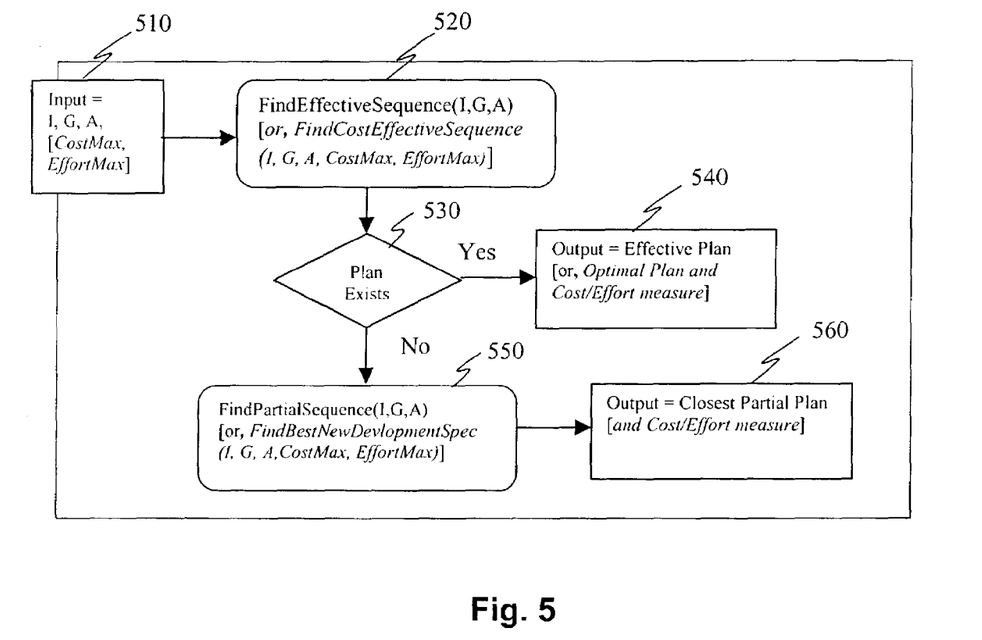
FIG. 5 is a flow diagram of a formulation of a software development problem to evaluate existing components and determine if any new development is needed.

FIG. 5 shows a formulation of the reduce problem where a single plan is output. For the case where cost and effort information is required, the formulation is in brackets. In other formulations, a set of plans can be output within a [CostMin, CostMax] and [EffortMin, EffortMax] range. In the latter case, both existing possibilities and partial plans that fall within the range can be returned.

At step 510, the user provides inputs I, G and A to the system (typically a computer-based decision support system). Input I represents the input data specification, goal state G represents the desired functionality and input A represents the set of executable actions. Additional inputs CostMax and EffortMax, relating to cost and effort information, apply if required. The effective sequence is determined at step 520 and it is determined whether a plan exists at step 540. If Yes, the effective plan is output at step 540. If No, a partial sequence is determined at step 550 and the closest partial plan is output at step 560.

Tables 4 and 5, hereinafter, show a pseudo-code embodiment for determining the effective sequence (FindCostEffectiveSequence: step 520) and for determining a

TABLE 4

FindCostEffectiveSequence(I, G, A, CostMax, EffortMax)
1. If I ⊃ G
2.   Return {}
3. End-if
4. MetricMax = CalculateMetric(CostMax, EffortMax)
5. Ninit.sequence = {}; Ninit.state = I;
   Ninit.cost = 0; Ninit.effort = 0
6. Q = {Ninit}
7. While Q is not empty
8.   N = Remove an element from Q
9.   Let S = N.sequence; T = N.state
10.  For each component Ai in A
11.    If precondition of Ai is satisfied in state S and
       CalculateMetric(Ninit.cost, Ninit.effort) < MetricMax
12.      Create new node N' with:
         N'.state = Update S with result of effect of Ai and
         N'.sequence = Append(N.sequence, A_I)
         N'.cost = update(N.cost, A_i.cost)
         N'.effort = update(N.effort, A_i.effort)
13.    End-if
14.    If N'.state ⊃ G and
       CalculateMetric(Ninit.cost, Ninit.effort) < MetricMax
15.      Return N' ;; Return a plan
16.    End-if
17.    Q = Q U N'
18.  End-for
19. End-while
20. Return FAIL ;; No plan was found
CalculateMetric(cost, effort)
1. Return evaluation on the desired function combining cost and
   effort measures

TABLE 5

FindBestNewDevlopmentSpec(I, G, A, CostMax, EffortMax)
1. CurrentCost = 0; CurrentEffort = 0;
   BestMeasure = CalculateMetric(CurrentCost, CurrentEffort);
   BestPlan = {}; MinSpec = {I, G}
2. If I ⊃ G
3.   Return BestPlan ;; No new development is needed
4. End-if
5. Ninit.sequence = {}; Ninit.state = I;
   Ninit.cost = 0; Ninit.effort = 0;
6. Q = {Ninit}
7. While Q is not empty
8.   N = Remove an element from Q
9.   Let S = N.sequence; T = N.state
10.  For each component Ai in A
11.    If precondition of Ai is satisfied in state S and
       Ninit.cost < CostMax and Ninit.effort < EffortMax
12.      Create new node N' with:
         N'.state = Update S with result of effect of Ai and
         N'.sequence = Append(N.sequence, A_I)
         N'.cost = update(N.cost, A_i.cost)
         N'.effort = update(N.effort, A_i effort)
         Measure = CalculateMetric(N'.cost,
                                   N'.effort);
13.    End-if TABLE 5-continued

```
14.     If N'.state ⊃ G and Ninit.cost < CostMax and
        Ninit.effort < EffortMax
15.        ReturnN' ;; Return a plan
16.     End-if
17.     Q = Q U N' in sorted order according to Measure
18.   End-for
19. End-while
20. Return FAIL ;; No plan was found
CalculateMetric(cost, effort)
1. Return evaluation on the desired function combining cost and
   effort measures
```

Application Scenarios-Software Maintenance

The following section describes embodiments of the present invention in software maintenance applications. Suppose that a software program A has been released and is currently being maintained. Users are provided with the plan used to create program A and a formal specification of program A.

Awareness of Enhanced Software Components

In maintaining an existing software program A, the user can detect or be made aware of software components B whose enhancements are of possible interest while maintaining program A. Software components B need only be upgraded by incorporating the enhancements if the enhancements are necessary for achieving the functional objectives of program A.

Figure 6:
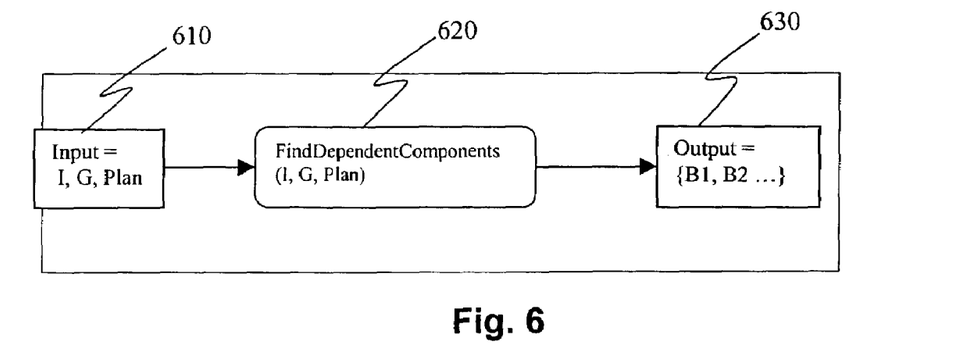
FIG. 6 is a flow diagram of a formulation of a software development problem to identify existing dependent components.

FIG. 6 shows a formulation of the problem of finding the dependent components of a software program. At step 610, the user provides inputs I, G and the Plan to the system (typically a computer-based decision support system). Input I represents the input data specification and goal state G represents the desired functionality. The system finds the number dependent components of program A at step 620 and outputs a list of dependent components at step 630.

A pseudo-code embodiment of a method/algorithm to identify the dependent components of program A is shown in Table 6, hereinafter.

TABLE 6

```
FindDependentComponents(I, G, Plan)
1. DependentComps = {}
2. For each component Ci in Plan
3.    DependentComps = DependentComps U Ci
4. End-for
5. Return DependentComps
```

Upgrading Software Components

In maintaining an existing software program A, the user can detect software components B whose enhancements must be incorporated in program A because of the effects of the enhancements on the functionality of program A. Notably, the action (component) library used to create the software program A may have changed.

Figure 7:
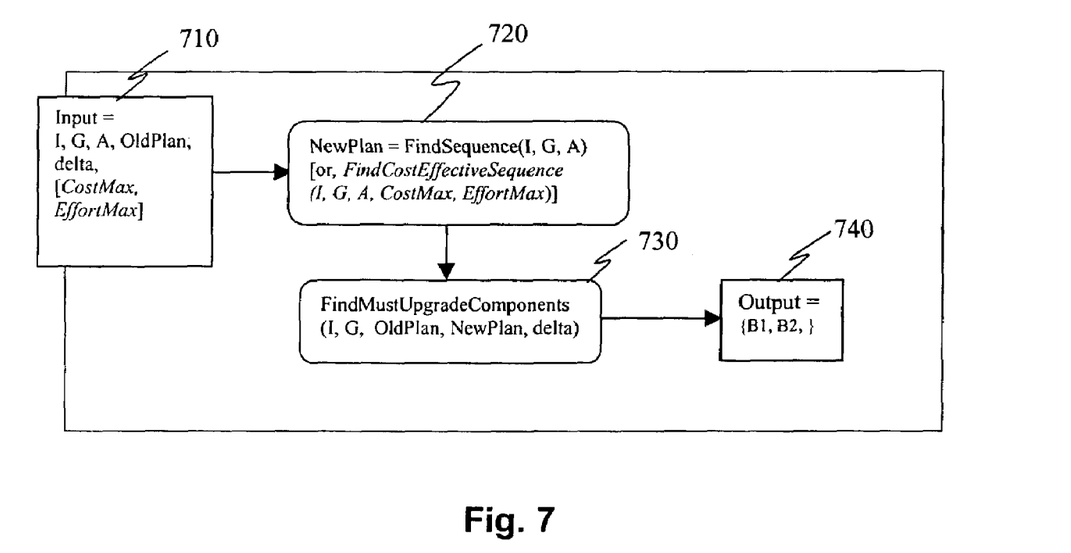
FIG. 7 is a flow diagram of a formulation of a software development problem to identify existing components to be upgraded.

FIG. 7 shows a formulation of a problem to find components that must be upgraded to maintain functionality of a software program. For the case where cost and effort information is required, the formulation is in brackets. At step 710, the user provides inputs I, G, A, OldPlan and Delta to the system (typically a computer-based decision support system). Input I represents the input data specification, goal state G represents the desired functionality, input A represents the set of executable actions, input OldPlan represents the plan prior to upgrade and Delta represents the upgrade changes. Additional inputs CostMax and EffortMax, relating to cost and effort information, apply if required. The effective sequence is determined to identify a new plan at step 720. Then, the components that have to be upgraded are identified at step 730 and output in a list at step 740.

A pseudo-code embodiment of a method/algorithm for identifying components of program A that must be upgraded is shown in Table 7, hereinafter.

TABLE 7

```
FindMustUpgradeComponents(I, G, OldPlan, NewPlan, delta)
1. UpgradeComps = {}
2. If I ⊃ G or OldPlan = NewPlan or
   DiffMetric(NewPlan, OldPlan) < delta
3.    Return UpgradeComps
4. End-if
5. For each component Ci in NewPlan
6.    If Ci is not present in OldPlan or
      DifferenceMetric(Ci, OldPlan.Ci) > delta
7.       UpgradeComps = UpgradeComps U Ci
8.    End-if
9. End-for
10. Return UpgradeComps
```

Computer Hardware and Software

Figure 8:
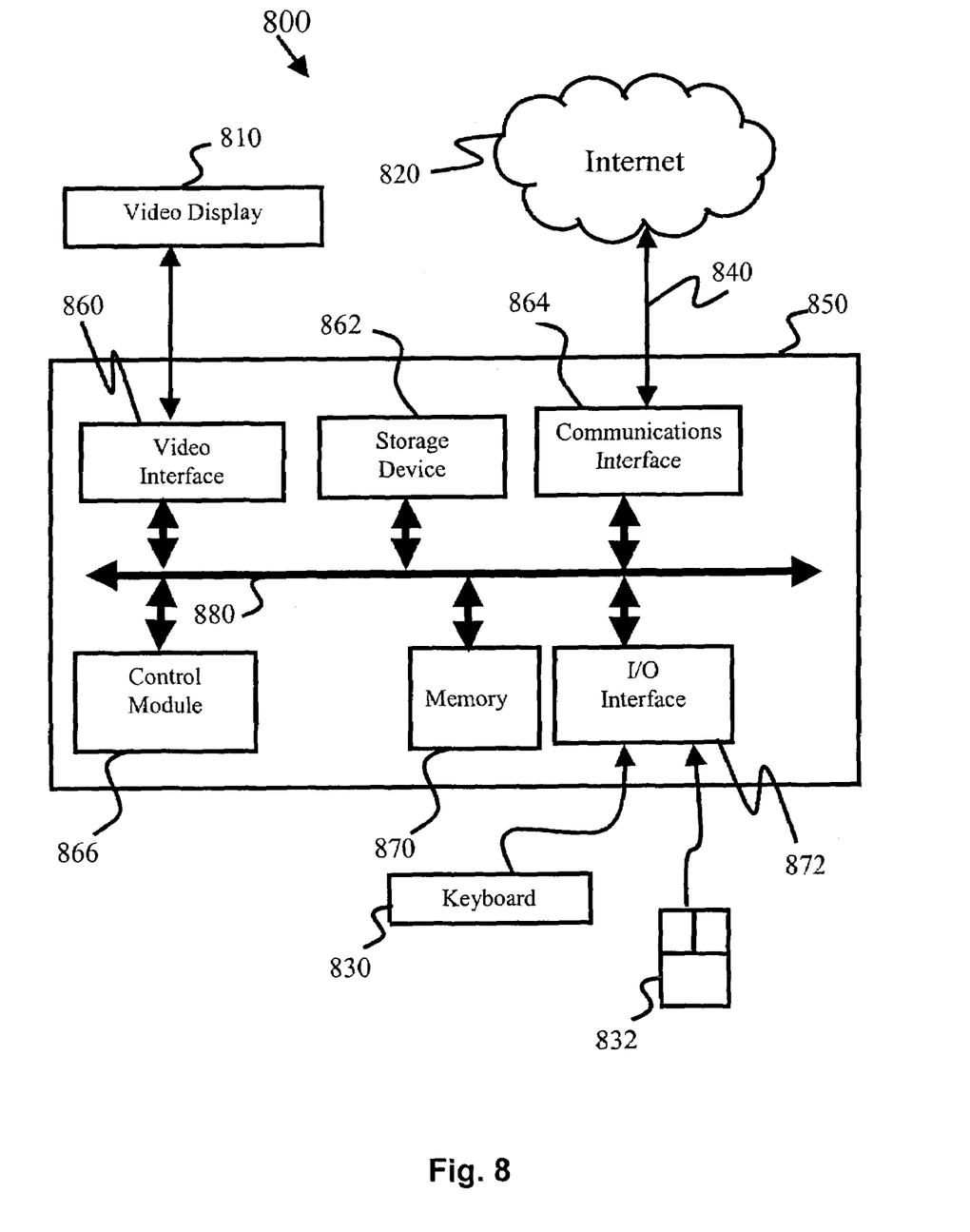
FIG. 8 is a block diagram of a computer system suitable for practicing embodiments of the present invention.

The method for automatically identifying options in a project can be implemented using a computer program product in conjunction with a computer system 800 as shown in FIG. 8. In particular, the method for automatically identifying options in a project can be implemented as software, or computer readable program code, executing on the computer system 800.

The computer system 800 includes a computer 850, a video display 810, and input devices 830 and 832. In addition, the computer system 800 can have any of a number of other output devices including line printers, laser printers, plotters, and other reproduction devices connected to the computer 850. The computer system 800 can be connected to one or more other computers via a communication interface 864 using an appropriate communication channel 840 such as a modem communications path, an electronic network, or the like. The network may include a local area network (LAN), a wide area network (WAN), an Intranet, and/or the Internet 820.

The computer 850 includes the control module 866, a memory 870 that may include random access memory (RAM) and read-only memory (ROM), input/output (I/O) interfaces 864, 872, a video interface 860, and one or more storage devices generally represented by the storage device 862. The control module 866 is implemented using a central processing unit (CPU) that executes or runs a computer readable program code that performs a particular function or related set of functions.

The video interface 860 is connected to the video display 810 and provides video signals from the computer 850 for display on the video display 810. User input to operate the computer 850 can be provided by one or more of the input devices 830, 832 via the I/O interface 872. For example, a user of the computer 850 can use a keyboard as I/O interface 830 and/or a pointing device such as a mouse as I/O interface 832. The keyboard and the mouse provide input to the computer 850. The storage device 862 can consist of one or more of the following: a floppy disk, a hard disk drive, a magneto-optical disk drive, CD-ROM, magnetic tape or any other of a number of non-volatile storage devices well known to those skilled in the art. Each of the elements in the computer system 850 is typically connected to other devices via a bus 880 that in turn can consist of data, address, and control buses.

The method steps for automatically identifying options in a project are effected by instructions in the software that are carried out by the computer system 800. Again, the software may be implemented as one or more modules for implementing the method steps.

In particular, the software may be stored in a computer readable medium, including the storage device 862 or that is downloaded from a remote location via the interface 864 and communications channel 840 from the Internet 820 or another network location or site. The computer system 800 includes the computer readable medium having such software or program code recorded such that instructions of the software or the program code can be carried out.

The computer system 800 is provided for illustrative purposes and other configurations can be employed without departing from the scope and spirit of the invention. The foregoing is merely an example of the types of computers or computer systems with which the embodiments of the invention may be practised. Typically, the processes of the embodiments are resident as software or a computer readable program code recorded on a hard disk drive as the computer readable medium, and read and controlled using the control module 866. Intermediate storage of the program code and any data including entities, tickets, and the like may be accomplished using the memory 870, possibly in concert with the storage device 862.

In some instances, the program may be supplied to the user encoded on a CD-ROM or a floppy disk (both generally depicted by the storage device 862), or alternatively could be read by the user from the network via a modem device connected to the computer 850. Still further, the computer system 800 can load the software from other computer readable media. This may include magnetic tape, a ROM or integrated circuit, a magneto-optical disk, a radio or infrared transmission channel between the computer and another device, a computer readable card such as a PCMCIA card, and the Internet 820 and Intranets including email transmissions and information recorded on Internet sites and the like. The foregoing are merely examples of relevant computer readable media. Other computer readable media may be practised without departing from the scope and spirit of the invention.

The method for automatically identifying options in a project can be realised in a centralised fashion in one computer system 800, or in a distributed fashion where different elements are spread across several interconnected computer systems.

Computer program means or computer program in the present context mean any expression, in any language, code or notation, of a set of instructions intended to cause a system having an information processing capability to perform a particular function either directly or after either or both of the following: a) conversion to another language, code or notation or b) reproduction in a different material form.

CONCLUSION

In the foregoing, a method, an apparatus, and a computer program product for automatically identifying options in a project are disclosed. Embodiments of the invention are useful and possess industrial application for project management across all industrial and business segments. Specifically, embodiments of the invention can be used for software lifecycle management and can be incorporated in:
- software building tools;
- software release/tracking tools; and
- software project management tools.

Various modifications and substitutions can be made to the techniques and arrangements described herein, as would be apparent to one skilled in the relevant art in the light of this disclosure, without departing from the scope and spirit of the invention.

I claim:

1. A method for automatically identifying options in a project that includes existing components, said method comprising:
   generating representations of existing reusable components, wherein said representations comprise predicates, including preconditions and effects;
   storing said representations for retrieval;
   formulating at least one decision-support issue arising in said project as a planning problem, such that said planning problems is formulated as one of a state-space planner and a plan-space planner using at least one of said representations, said planning problem including:
      a complete description of an initial state;
      a partial description of a goal state; and
      a set of executable actions, wherein an action is applicable in said initial state if a precondition of said action is satisfied in said initial state;
   solving said planning problem using said one of a state-space planner and a plan-space planner and automated reasoning techniques to identify options relating to said project, wherein a resulting state is obtained by incorporating the effects of said action in a sequence from said initial state and said resulting state contains said goal state; and
   identifying a set of solutions to meet an optimization criteria for said planning problem by determining whether to automatically select said existing reusable components and whether to select a partial solution for said planning problem.

2. The method according to claim 1, wherein the step of solving said planning problem comprises at least one of:
   identifying existing components for reuse;
   identifying existing components to be upgraded; and
   specifying new components to be developed.

3. A decision support method for management of a software project that uses existing software components, said method comprising:
   generating models of existing reusable software components, wherein said models comprise predicates, including preconditions and effects;
   storing said models for retrieval;
   formulating at least one decision problem arising in said software project as a planning problem, such that said planning problems is formulated as one of a state-space planner and a plan-space planner using at least one of said models, said planning problem including:
      a complete description of an initial state;
      a partial description of a goal state; and
      a set of executable actions, wherein an action is applicable in said initial state if a precondition of said action is satisfied in said initial state;
   solving said planning problem using said one of a state-space planner and a plan-space planner and automated reasoning techniques to identify options relating to the management of said software project, wherein a resulting state is obtained by incorporating the effects of said action and said resulting state contains said goal state; and identifying a set of solutions to meet an optimization criteria for said planning problem by determining whether to automatically select said existing reusable software components and whether to select a partial solution for said planning problem.

4. The method according to claim 3, wherein the step of solving said planning problem comprises at least one of:
identifying existing software components for reuse;
identifying existing software components to be upgraded; and
specifying new software components to be developed.

5. The method according to claim 4, wherein a model of an existing software component includes at least one characteristic from any one of:
a functionality of said software component;
a dependency of said software component on other software components;
a performance of said software component;
an effort required to develop said software component; and
an effort required to integrate said software component.

6. The method according to claim 5, wherein at least one of said characteristic comprises structured information available at a time of release of said software component.

7. A system for automatically identifying options in a project that includes existing components, said system comprising:
a first processor operable for generating representations of existing reusable components, wherein said representations comprise predicates, including preconditions and effects;
a memory unit accessible by said first processor, said memory unit operable for storing said representations for retrieval;
a second processor operable for formulating at least one decision-support issue arising in said project as a planning problem, such that said planning problems is formulated as one of a state-space planner and a plan-space planner using one or more of said representations, said planning problem including:
a complete description of an initial state;
a partial description of a goal state; and
a set of executable actions, wherein an action is applicable in said initial state, if a precondition of said action is satisfied in said initial state; and
a third processor operable for solving said planning problem using said one of a state-space planner and a plan-space planner and automated reasoning techniques to identify options relating to said project,
wherein said third processor is operable for identifying a set of solutions including a resulting state is obtained by incorporating the effects of said action said action in a sequence from said initial state and said resulting state contains said goal state, to meet an optimization criteria for said planning problem by determining whether to automatically select said existing reusable components and whether to select a partial solution for said planning problem.

8. The system according to claim 7, wherein said second processor comprises:
a first sub-processor operable for defining an input data specification of said project as said initial state of said planning problem;
a second sub-processor operable for defining a functionality requirement of said project as contains said goal state of said planning problem; and
a third sub-processor operable for defining at least one of said existing components as said action of said planning problem, wherein each action has at least one precondition corresponding to an input of said existing component and each action has at least one effect corresponding to an output of said existing component.

9. The system according to claim 7, wherein said third processor comprises at least one of:
a first sub-processor operable for identifying existing components for reuse;
a second sub-processor operable for identifying existing components be upgraded; and
a third sub-processor operable for specifying new components to be developed.

10. A decision support system for management of a software project that uses existing software components, said system including:
a first processor operable for generating models of existing reusable software components, wherein said models comprise predicates, including preconditions and effects;
a memory unit accessible by said first processor, said memory unit operable for storing said models for retrieval;
a second processor operable for formulating at least one decision problem arising in said software project as a planning problem, such that said planning problems is formulated as one of a state-space planner and a plan-space planner using at least one of said models, said planning problem including:
a complete description of an initial state;
a partial description of a goal state; and
a set of executable actions wherein an action is applicable in said initial state, if a precondition of said action is satisfied in said initial state; and
a third processor operable for solving said planning problem using said one of a state-space planner and a plan-space planner and automated reasoning techniques to identify options relating to the management of said software project,
wherein a resulting state is obtained by incorporating the effects of said action and said resulting state contains said goal state, and
wherein said third processor is operable for identifying a set of solutions to meet an optimization criteria for said planning problem by determining whether to automatically select said existing reusable software components and whether to select a partial solution for said planning problem.

11. The decision support system according to claim 10, wherein said second processor comprises:
a first sub-processor operable for defining an input data specification of said software project as said initial state of said planning problem;
a second sub-processor operable for defining a functionality requirement of said software project as contains said goal state of said planning problem; and
a third sub-processor operable for defining at least one of said existing components as said action of said planning problem, wherein each action has at least one precondition corresponding to an input of said existing component and each action has at least one effect corresponding to an output of said existing component.

12. The decision support system according to claim 10, all the wherein said third processor comprises at least one of:
- a first sub-processor operable for identifying existing components for reuse;
- a second sub-processor operable for identifying existing components be upgraded; and
- a third sub-processor operable for specifying new components to be developed.

13. The decision support system according to claim 12, wherein a model of an existing software component includes at least one characteristic comprising:
- a functionality of said software component;
- a dependency of said software component on other software components;
- a performance of said software component;
- an effort required to develop said software component; and
- an effort required to integrate said software component.

14. The decision support system according to claim 13, wherein at least one said characteristic comprises structured information available at a time of release of said software component.

15. A computer program product having a computer readable storage medium executing a method for automatically identifying options in a project that includes existing components, said method comprising:
- generating representations of existing reusable components, wherein said representations comprise predicates, including preconditions and effects;
- storing said representations for retrieval;
- formulating at least one decision-support issue arising in said project as a planning problem, such that said planning problems is formulated as one of a state-space planner and a plan-space planner using at least one of said representations, said planning problem including:
  - a complete description of an initial state;
  - a partial description of a goal state; and
  - a set of executable actions, wherein an action is applicable in said initial state, if a precondition of said action is satisfied in said initial state;
- solving said planning problem using said one of a state-space planner and a plan-space planner and automated reasoning techniques to identify options relating to said project, wherein a resulting state is obtained by incorporating the effects of said action in a sequence from said initial state and said resulting state, contains said goal state; and
- identifying a set of solutions to meet an optimization criteria for said planning problem by determining whether to automatically select said existing reusable components and whether to select a partial solution for said planning problem.

16. The computer program product according to claim 15, wherein said step of formulating said planning problem includes:
- defining an input data specification of said project as said initial state of said planning problem;
- defining a functionality requirement of said project as contains said goal state of said planning problem; and
- defining at least one of said existing components as said action of said planning problem, wherein each action has at least one precondition corresponding to an input of said existing component and each action has at least one effect corresponding to an output of said existing component.

17. The computer program product according to claim 15, wherein said step of solving said planning problem comprises at least one of:
- identifying existing components for reuse;
- identifying existing components to be upgraded; and
- specifying new components to be developed.

18. A computer program product having a computer readable storage medium executing a method for management of a software project that uses existing software components, said method comprising:
- generating models of existing reusable software components, wherein said models comprise predicates, including preconditions and effects;
- storing said models for retrieval;
- formulating at least one decision problem arising in said software project as a planning problem, such that said planning problems is formulated as one of a state-space planner and a plan-space planner using at least one of said models, said planning problem including:
  - a complete description of an initial state;
  - a partial description of a goal state; and
  - a set of executable actions, wherein an action is applicable in said initial state, if a precondition of said action is satisfied in said initial state;
- solving said planning problem using said one of a state-space planner and a plan-space planner and automated reasoning techniques to identify options relating to the management of said software project, wherein a resulting state is obtained by incorporating the effects of said action and said resulting state contains said goal state; and
- identifying a set of solutions to meet an optimization criteria for said planning problem by determining whether to automatically select said existing reusable software components and whether to select a partial solution for said planning problem.

19. The computer program product according to claim 18, wherein said step of formulating said planning problem includes:
- defining an input data specification of said software project as said initial state of said planning problem;
- defining a functionality requirement of said software project as contains said goal state of said planning problem; and
- defining at least one of said existing components as said action of said planning problem, wherein each action has at least one precondition corresponding to an input of said existing component and each action has at least one effect corresponding to an output of said existing component.

20. The computer program product according to claim 18, wherein said step of solving said planning problem comprises at least one of:
- identifying existing software components for reuse; and
- specifying new software components to be developed.

21. The computer program product according to claim 20, wherein a model of an existing software component includes at least one characteristic comprising:
- a functionality of said software component;
- a dependency of said software component on other software components;
- a performance of said software component;
- an effort required to develop said software component; and
- an effort required to integrate said software component.

22. The computer program product according to claim 21, wherein at least one said characteristic comprises structured information available at a time of release of said software component.

23. A decision support method for maintenance of a software program, said method including the steps of:
  formulating at least one decision support issue relating to said software program as a planning problem, such that said planning problems is formulated as one of a state-space planner and a plan-space planner using at least one model of existing reusable software components, said planning problem including:
    a complete description of an initial state;
    a partial description of a goal state; and
    a set of executable actions, wherein an action is applicable in said initial state, if a precondition of said action is satisfied in said initial state, wherein said at least one model comprises predicates, including preconditions and effects;
  solving said planning problem using said one of a state-space planner and a plan-space planner and automated reasoning techniques to automatically identify options relating to said decision support issue, wherein a resulting state is obtained by incorporating the effects of said action and said resulting state contains said goal state; and
  identifying a set of solutions to meet an optimization criteria for said planning problem by determining whether to automatically select said existing reusable software components and whether to select a partial solution for said planning problem.

24. The method according to claim 23, wherein the step of formulating said planning problem comprises:
  defining an input data specification of said software program as said initial state of said planning problem;
  defining a functionality requirement of said software program as contains said goal state of said planning problem; and
  defining at least one of said existing components as said action of said planning problem, wherein each action has at least one precondition corresponding to an input of said existing component and each action has at least one effect corresponding to an output of said existing component.

25. The method according to claim 23, wherein the step of solving said planning problem comprises at least one of:
  identifying existing software components for reuse;
  identifying existing software components to be upgraded; and
  specifying new software components to be developed.

26. A decision support system for maintenance of a software program, including:
  a first processor operable for formulating at least one decision support issue relating to said software program as a planning problem, such that said planning problems is formulated as one of a state-space planner and a plan-space planner using at least one model of existing reusable software components, said planning problem including:
    a complete description of an initial state;
    a partial description of a goal state; and
    a set of executable actions, wherein an action is applicable in said initial state, if a precondition of said action is satisfied in said initial state, wherein said at least one model comprises predicates, including preconditions and effects; and
  a second processor operable for solving said planning problem using said one of a state-space planner and a plan-space planner and automated reasoning techniques to automatically identify options relating to said decision support issue,
  wherein a resulting state is obtained by incorporating the effects of said action and said resulting state contains said goal state, and
  wherein said second processor is operable for identifying a set of solutions to meet an optimization criteria for said planning problem by determining whether to automatically select said existing reusable software components and whether to select a partial solution for said planning problem.

27. The decision support system according to claim 26, wherein said first processor includes:
  a first sub-processor operable for defining an input data specification of said software program as said initial state of said planning problem;
  a second sub-processor operable for defining a functionality requirement of said software program as contains said goal state of said planning problem; and
  a third sub-processor operable for defining at least one of said existing components as said action, of said planning problem, wherein each action has at least one precondition corresponding to an input of said existing component and each action has at least one effect corresponding to an output of said existing component.

28. The decision support system according to claim 26, wherein said second processor comprises at least one of:
  a first sub-processor operable for identifying existing software components for reuse;
  a second sub-processor operable for identifying existing software components to be upgraded; and
  a third sub-processor operable for specifying new software components to be developed.

29. A computer program product having a computer readable storage medium executing a method for maintenance of a software program, said method including:
  formulating at least one decision support issue relating to said software program as a planning problem, formulated as one of a state-space planner and a plan-space planner using at least one model of existing reusable software components, said planning problem including:
    a complete description of an initial state;
    a partial description of a goal state; and
    a set of executable actions, wherein an action is applicable in said initial state, if a precondition of said action is satisfied in said initial state, wherein said at least one model comprises predicates, including preconditions and effects;
  solving said planning problem using said one of a state-space planner and a plan-space planner and automated reasoning techniques to automatically identify options relating to said decision support issue, wherein a resulting state is obtained by incorporating the effects of said action and said resulting state contains said goal state; and
  identifying a set of solutions to meet an optimization criteria for said planning problem by determining whether to automatically select said existing reusable software components and whether to select a partial solution for said planning problem.

30. The computer program product according to claim 29, wherein said step of formulating includes:
- defining an input data specification of said software program as said initial state of said planning problem;
- defining a functionality requirement of said software program as contains said goal state of said planning problem; and
- defining at least one of said existing components as said action of said planning problem, wherein each action has at least one precondition corresponding to an input of said existing component and each action has at least one effect corresponding to an output of said existing component.

31. The computer program product according to claim 29, wherein said step of solving said planning problem comprises at least one of:
- identifying existing software components for reuse;
- identifying existing software components to be upgraded; and
- specifying new software components to be developed.

\* \* \* \* \*